3,322,547
ALLOY POWDER FOR FLAME SPRAYING
Joseph F. Quaas, Island Park, and Daniel P. Tanzman, Far Rockaway, N.Y., assignors to Eutectic Welding Alloys Corporation, Flushing, N.Y., a corporation of New York
No Drawing. Filed Mar. 27, 1964, Ser. No. 355,497
12 Claims. (Cl. 106—1)

This invention relates to a metal alloy in powdered mesh form which can be used in the flame spray process. More particularly this invention relates to a heterogeneous mixture of two alloy systems in powder mesh form, one a copper-phosphorus and the other a tin-bronze mesh alloy powder which can be sprayed with a metal spraying torch for application to copper base and bronze parent materials.

The use of copper-phosphorus alloy powder on copper base and bronze parent materials is subject to a number of difficulties. The fluidity of various copper-phosphorus alloy powder compositions greatly varies. Excess fluidity is typical and is detrimental to overall brazing techniques. Furthermore, copper-phosphorus alloys are normally prone to be too brittle. It is also known that copper-phosphorus alloys have the attendant disadvantages of oxidation and fuming, which detract from the over-all desirability of these alloys in the flame spraying process.

It is an object of this invention to provide an alloy composition for use in the flame spraying process which deposits a ductile coating of relatively high bend tolerance when used on copper base and bronze parent metals.

It is another object to provide such an alloy composition of controlled fluidity which does not suffer the disadvantage of excess fluidity in the flame spraying process.

It is a further object to provide such an alloy mixture which may be deposited by the flame spraying process without excessive oxidation or fuming.

These and other objects are attained according to the invention by a metal alloy composition in powdered mesh form which comprises a heterogeneous mixture of two alloy systems. The two alloy systems are a copper-phosphorus alloy mesh powder on one hand and a tin bronze alloy mesh powder on the other.

The copper-phosphorus alloy mesh and the tin-bronze alloy mesh may be used in varying percentages by weight. Suitable ranges are as follows:

| Constituent | Range in Percent by Weight | | |
|---|---|---|---|
| | Broad | Preferred | Example |
| Tin-Bronze | 2–40 | 2–10 | 2.5 |
| Copper-Phosphorus | 98–60 | 98–90 | 97.5 |

Generally speaking, both alloy systems are employed in admixture in a small particle size. The particles are generally employed in a size below 150 mesh. While there is no theoretical lower limit on the particle size which may be employed, it has been found best to maintain a particle size larger than 400 mesh for proper and satisfactory feeding through a metal spraying torch.

The copper-phosphorus alloy system employed in this invention includes those alloys classified as BCuP indicated in the Brazing Manual published by Reinhold Publishing Corporation, 1955. Typical alloy compositions are as follows:

| AWS-ASTM Classification | Nominal Composition, Weight Percent | | |
|---|---|---|---|
| | Copper | Silver | Phosphorus |
| BCuP-1 | 95 | 0 | 5 |
| BCuP-2 | 92.75 | 0 | 7.25 |
| BCuP-3 | 89 | 5 | 6 |
| BCuP-4 | 86.75 | 6 | 7.25 |
| BCuP-5 | 80 | 15 | 5 |

Generally speaking, the chemical range of the copper-phosphorus alloy found useful according to the invention is as follows:

| Constituent | Percent by Weight | | |
|---|---|---|---|
| | Broad | Preferred | Example |
| Phosphorus | 3–20 | 5 to 7.5 | 6 |
| Silver | 3–10 | 0 to 6 | 5 |
| Copper | 75–98 | 87 to 95 | 89 |

The tin-bronze mesh alloy which is blended with the copper-phosphorus alloy includes the alloy indicated under AWS A5.7–52 ASTM B–259–52 Class RCuSn. The general chemical range of tin-bronze mesh alloy which has been found suitable according to the invention is as follows:

| Constituent | Percent by weight | | |
|---|---|---|---|
| | Broad | Preferred | Example |
| Copper | 80–97 | 84.5–94.9 | 93–70 |
| Phosphorus | .05–.75 | .10–.50 | .30 |
| Tin | 2.5–20 | 5–15 | 6.0 |

The tin-bronze mesh alloy may include the following maximum quantities of residual materials by weight Percent
Fe _____ .05
Pb _____ .05
Zn _____ .10

It has unexpectedly been found that whereas copper-phosphorus alloy systems in general tend to be brittle, the alloy system according to the invention provides a ductile deposit.

For example, when deposits are made on copper plates 2" x ⅜" x 5" as the parent material, it is found that the use of copper-phosphorus alloy system alone produces a bend tolerance of only 30 degrees. On the other hand, when tin-bronze alloy mesh is added according to the invention, a bend tolerance of from 45–50 degrees results. This greater ductility is most unexpected since the art is generally aware that copper-phosphorus alloy systems are prone to be brittle.

It has further been found that the addition of the tin-copper alloy powder reduces the excess fluidity of the copper-phosphorus alloy system during deposition.

It has additionally been found that the alloy composition according to the invention shows materially improved oxidation and fuming properties.

It has also been found that whereas a heterogeneous mixture of two alloy systems is used according to the invention, and whereas each alloy system has a distinctly different melting point, segregation of the two alloys does not occur in the deposit. This unexpected effect appears to be due to the superheating effect of the flame which apparently enables perfect intermixing and alloying of the powdered constituents during transfer from the torch to the parent material.

While we are not positive why the composition according to the invention unexpectedly accomplishes the above objects, it appears that it is due in part to the fact that the additional tin-bronze component broadens the mushy range so that as the superheated metal alloy makes contact with the parent material it is more quickly cooled to a temperature below the liquidus whereby the fluidity of the molten pool is reduced.

We claim:

1. A metal alloy composition for flame spraying comprising from 2 to 40 percent by weight of a powdered tin-bronze alloy and from 98–50 percent by weight of a powdered copper-phosphorus alloy.

2. The metal alloy composition according to claim 1 wherein the tin-bronze alloy is present in an amount of from 2 to 10 percent by weight and the copper-phosphorus alloy is present in an amount of from 90 to 98 percent by weight.

3. The metal alloy composition according to claim 1 wherein the tin-bronze alloy and the copper-phosphorus alloy are present in a particle size below 150 mesh.

4. The metal alloy composition according to claim 3 wherein the tin-bronze alloy and the copper-phosphorus alloy are present in a particle size above 400 mesh.

5. The metal alloy composition according to claim 1 wherein the tin-bronze alloy contains the following constituents in the indicated percents by weight:

| Constituents: | Percent by weight |
|---|---|
| Copper | 80 to 97 |
| Phosphorus | .05 to .75 |
| Tin | 2.5 to 20 |

6. The metal alloy composition according to claim 1 wherein the copper-phosphorus alloy contains the following constituents in the indicated percents by weight:

| Constituents: | Percent by weight |
|---|---|
| Phosphorus | 3 to 20 |
| Silver | 3 to 10 |
| Copper | 75 to 98 |

7. A metal alloy composition for flame spraying comprising from 2 to 40 percent by weight of a tin-bronze alloy having a particle size below 150 mesh and containing the following constituents in the indicated percents by weight:

| Constituents: | Percent by weight |
|---|---|
| Copper | 80 to 97 |
| Phosphorus | .05 to .75 |
| Tin | 2.5 to 20 | and from 98 to 60 percent by weight of a copper-phosphorus alloy having a particle size below 150 mesh and containing the following constituents in the indicated percents by weight:

| Constituents: | Percent by weight |
|---|---|
| Phosphorus | 3 to 20 |
| Silver | 3 to 10 |
| Copper | 75 to 98 |

8. The metal alloy composition according to claim 7 wherein the particle size of the tin-bronze and the copper-phosphorus alloy is above 400 mesh.

9. The metal alloy composition according to claim 7 wherein the copper-phosphorus alloy contains the following constituents in the following percents by weight:

| Constituents: | Percent by weight |
|---|---|
| Phosphorus | 5 to 7.5 |
| Silver | 0 to 6 |
| Copper | 87 to 95 |

10. The metal alloy composition according to claim 7 wherein the tin-bronze alloy contains the following constituents in the following percents by weight:

| Constituents: | Percent by weight |
|---|---|
| Copper | 84.5 to 94.9 |
| Phosphorus | .10 to .50 |
| Tin | 5 to 15 |

11. The metal alloy composition according to claim 7 wherein the tin-bronze alloy is present in a percent by weight of from 2 to 10 percent and the copper-phosphorus alloy is present in a percent by weight of from 98 to 90 percent by weight.

12. A metal alloy composition for flame spraying comprising 2.5 percent tin-bronze alloy containing 93.7 percent copper, 0.30 percent phosphorus and 6.0 percent tin and 97.5 percent copper-phosphorus alloy containing 6 percent phosphorus, 5 percent silver and 89 percent copper, all percents being on a weight basis, the particle size of the alloy composition being between 150 and 400 mesh.

References Cited

UNITED STATES PATENTS 2,961,335  11/1960  Shepard _____ 117—46 XR
2,966,423  12/1960  Shichman _____ 117—22 XR ALEXANDER H. BRODMERKEL, *Primary Examiner.*

MORRIS LIEBMAN, *Examiner.*

L. B. HAYES, *Assistant Examiner.*

UNITED STATES PATENT OFFICE
CERTIFICATE OF CORRECTION

Patent No. 3,322,547                      May 30, 1967

Joseph F. Quaas et al.

It is certified that error appears in the above identified patent and that said Letters Patent are hereby corrected as shown below:

Column 3, line 21, for "98-50" read -- 98-60 --.

This Certificate supersedes the Certificate of Correction for Patent No. 3,326,952 inadvertently inserted in Letters Patent No. 3,322,547.

Signed and sealed this 8th day of July 1969.

(SEAL)
Attest:

Edward M. Fletcher, Jr.               WILLIAM E. SCHUYLER, JR.
Attesting Officer                         Commissioner of Patents